Figure 1:
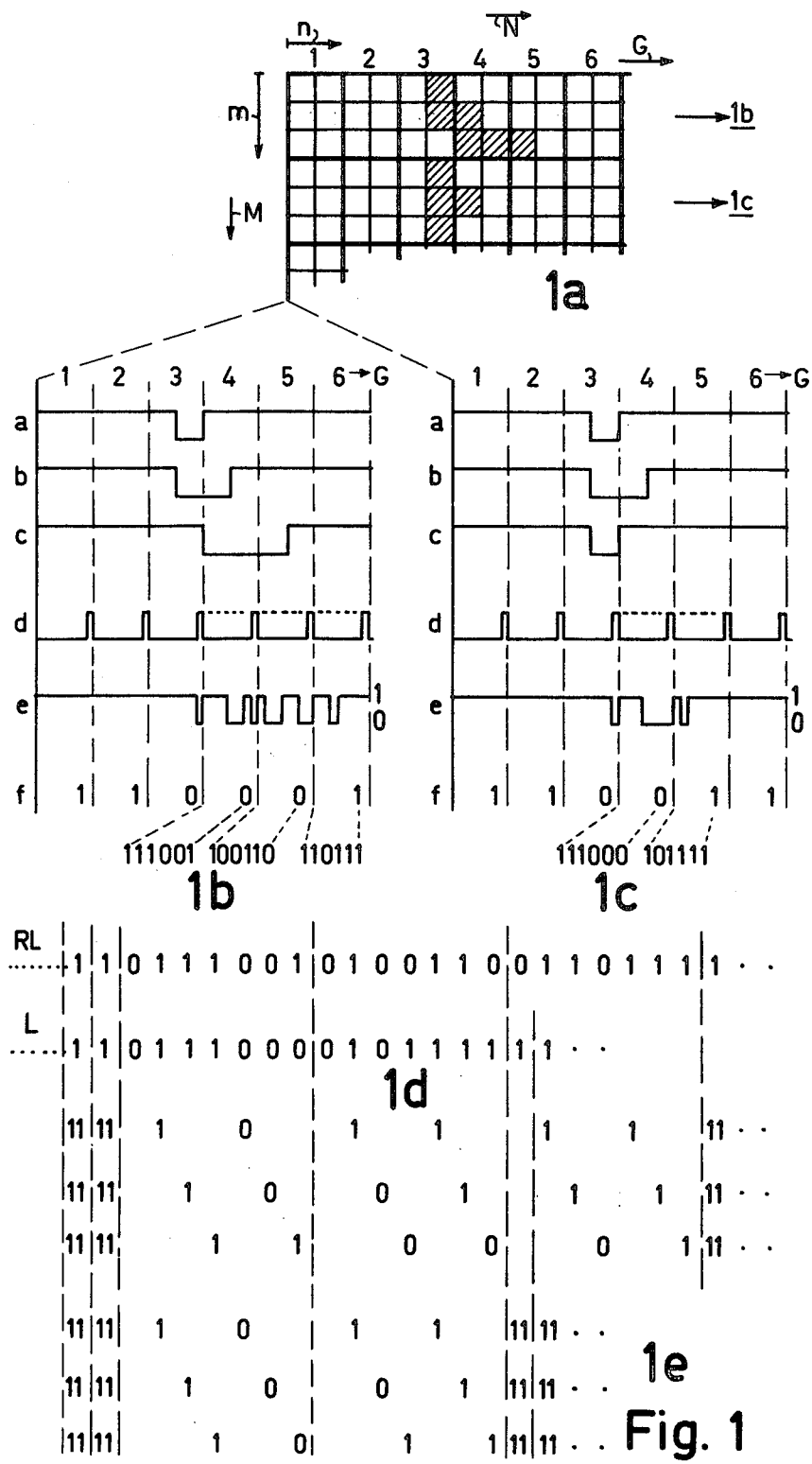

United States Patent [19]

Groothuis

[11] 4,100,580

[45] Jul. 11, 1978

[54] FACSIMILE SYSTEM

[75] Inventor: Hermanus Hubertus Hendrikus Groothuis, Eindhoven, Netherlands

[73] Assignee: U.S. Philips Corporation, New York, N.Y.

[21] Appl. No.: 659,428

[22] Filed: Feb. 19, 1976

Related U.S. Application Data

[63] Continuation of Ser. No. 470,797, May 17, 1974, abandoned.

[30] Foreign Application Priority Data

Jun. 1, 1973 [NL] Netherlands .................. 7307630

[51] Int. Cl.$^2$ .................. H04N 1/40; H04N 7/12
[52] U.S. Cl. .................. 358/260; 340/347 DD; 358/261
[58] Field of Search .................. 178/6, 6.8, DIG. 3; 358/260, 261, 135, 138; 340/347 DD

[56] References Cited

U.S. PATENT DOCUMENTS

| 3,478,266 | 11/1969 | Gardenhire | 358/138 |
| 3,483,317 | 12/1969 | De Groat | 358/260 |
| 3,571,505 | 3/1971 | Mounts | 358/136 |
| 3,580,999 | 5/1971 | Mounts | 358/136 |
| 3,726,993 | 4/1973 | Lavallee | 358/260 |
| 3,730,988 | 5/1973 | Shimizu | 358/288 |
| 3,813,485 | 5/1974 | Arps | 358/261 |

Primary Examiner—Howard W. Britton
Attorney, Agent, or Firm—Frank R. Trifari; Henry I. Steckler

[57] ABSTRACT

A facsimile system including a picture pick-up arrangement in which the picture information to be transmitted is processed in separate groups of picture elements. The information of a first number of adjacent lines and a second number of adjacent picture elements is applied to a picture element comparison circuit. When only white information occurs in a group of picture elements thus formed this picture element group is represented by a logical 1. When there is black information in the picture element group an instantaneous derived code signal is formed with a logical 0 followed by a number of bits suitable for picture element coding. A considerable bit reduction is the result as compared with a one-bit representation per picture element. A specific choice of a clock pulse frequency results in a simple signal coding.

21 Claims, 11 Drawing Figures

FACSIMILE SYSTEM

This is a continuation of application Ser. No. 470,797, filed May 17, 1974, now abandoned.

The invention relates to a facsimile system comprising a picture pick-up arrangement and a picture display arrangement coupled thereto through a transmission path, which picture pick-up arrangement includes a picture pick-up device for converting line by line, through lines comprising picture elements, picture information to be transmitted into a picture signal, and a picture signal coding circuit provided with a picture element comparison circuit for deriving a coded signal from picture signal values associated with adjacent picture information, the picture display arrangement including a signal decoding circuit for decoding the received coded signal, and a picture display device coupled thereto, the signal coding and decoding circuits being formed with a clock pulse source for control purposes and being connected to a store for storage of the coded signal. Furthermore, the invention relates to a picture pick-up and picture display arrangement suitable for this purpose.

Such a facsimile system is described in French patent specification No. 1,452,663, and British Pat. No. 1,452,663. Each picture element is coded in conjunction with adjacent picture elements such as a picture element occurring earlier on the same line and the uppermost picture element on a preceding line, and a picture element occurring earlier and later. Coding is effected in a relative manner, that is to say, the first picture element of a local black information is coded as a starting point with a start code and a subsequent place code and the subsequent picture elements on the line are each coded in a specific manner with repetition codes as a function of the fact in which adjacent considered picture elements black information also occurs. Dependent on the combinations there are different repetition codes which thus contain information with regard to the continuation of the black information in the line scan direction and transversely thereto. At the end of a local black information a final code is given for the relevant picture element. A subsequent black information occurring separately from the previous one then starts again with a start code and a place code followed by repetition codes and a final code.

The said patent specification describes that for the codes three bits are used while the place code at the start comprises ten bits. The number of three bits for coding each picture element with black information may be considered to be high, let alone the place coding with ten bits for each separately occurring local black information.

Furthermore the errors normally occurring in relative coding are present such as inter alia the continuation of an error occurring during coding of a picture element in subsequent picture elements with all attendent results during display.

It is an object of the invention to realise a facsimile system and arrangements suitable therefore without the described drawbacks in which the simplest possible coding method is accompanied by a correctly displayed picture information. to this end the facsimile system according to the invention is characterized in that the picture element comparison circuit in the signal coding circuit is formed for comparing the picture element signal values associated with a first number of adjacent lines and a second number of adjacent picture elements or one picture element of each of the said lines, said picture element comparison circuit being connected to a signal coder in the signal coding circuit for supply of a comparison signal thereto which in the presence of one and the same fixed picture signal value in all compared picture elements constituting a group causes the coder to provide a determined fixed code signal and which in the absence of the same fixed picture signal value in all picture elements of the group releases the coder for supplying during processing of the said picture signal values an instantaneous code signal derived as a function of the occurrence of the difference picture signal values in the respective compared picture elements of the group.

Figure 2:
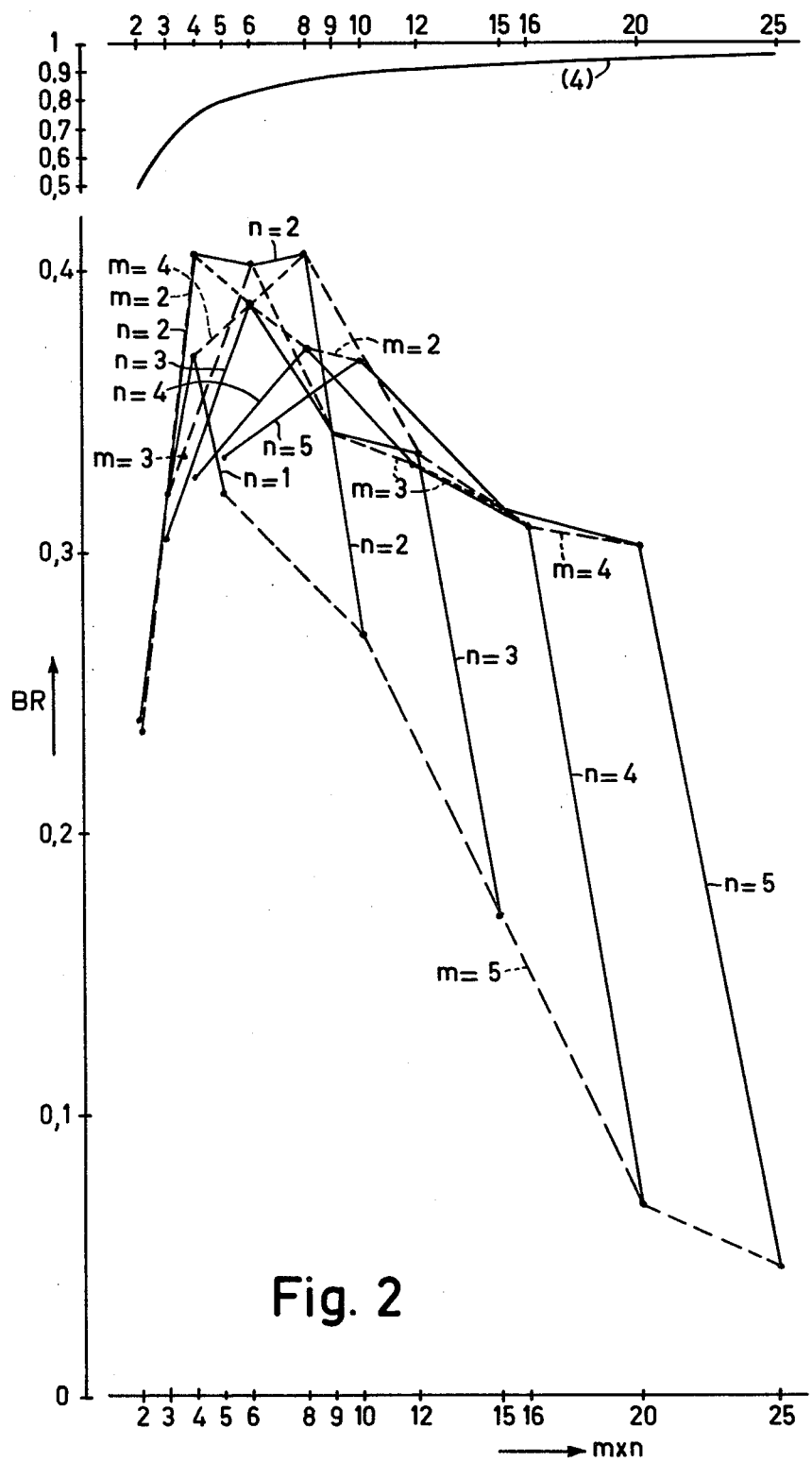
Figure 3:
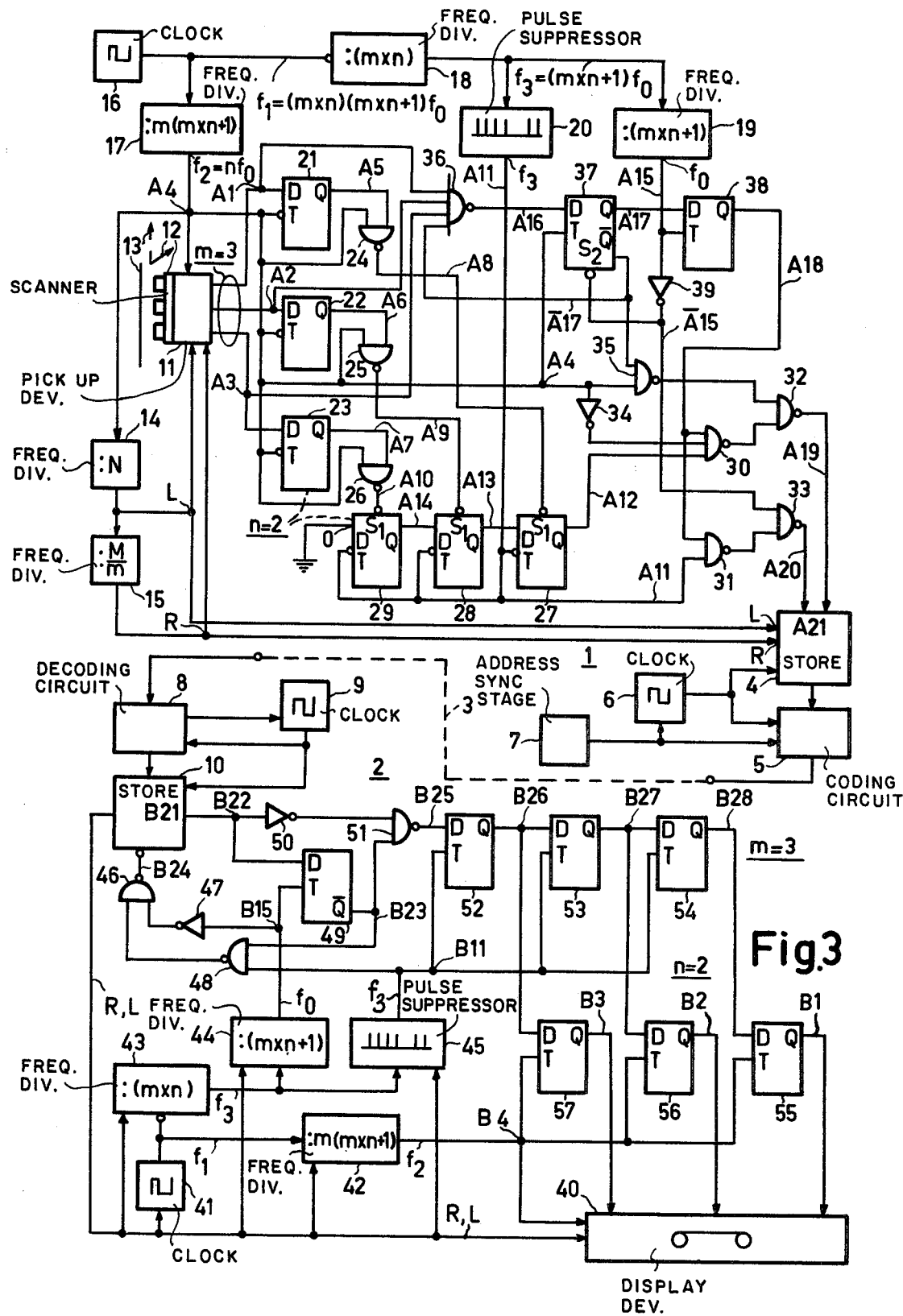
Figure 4:
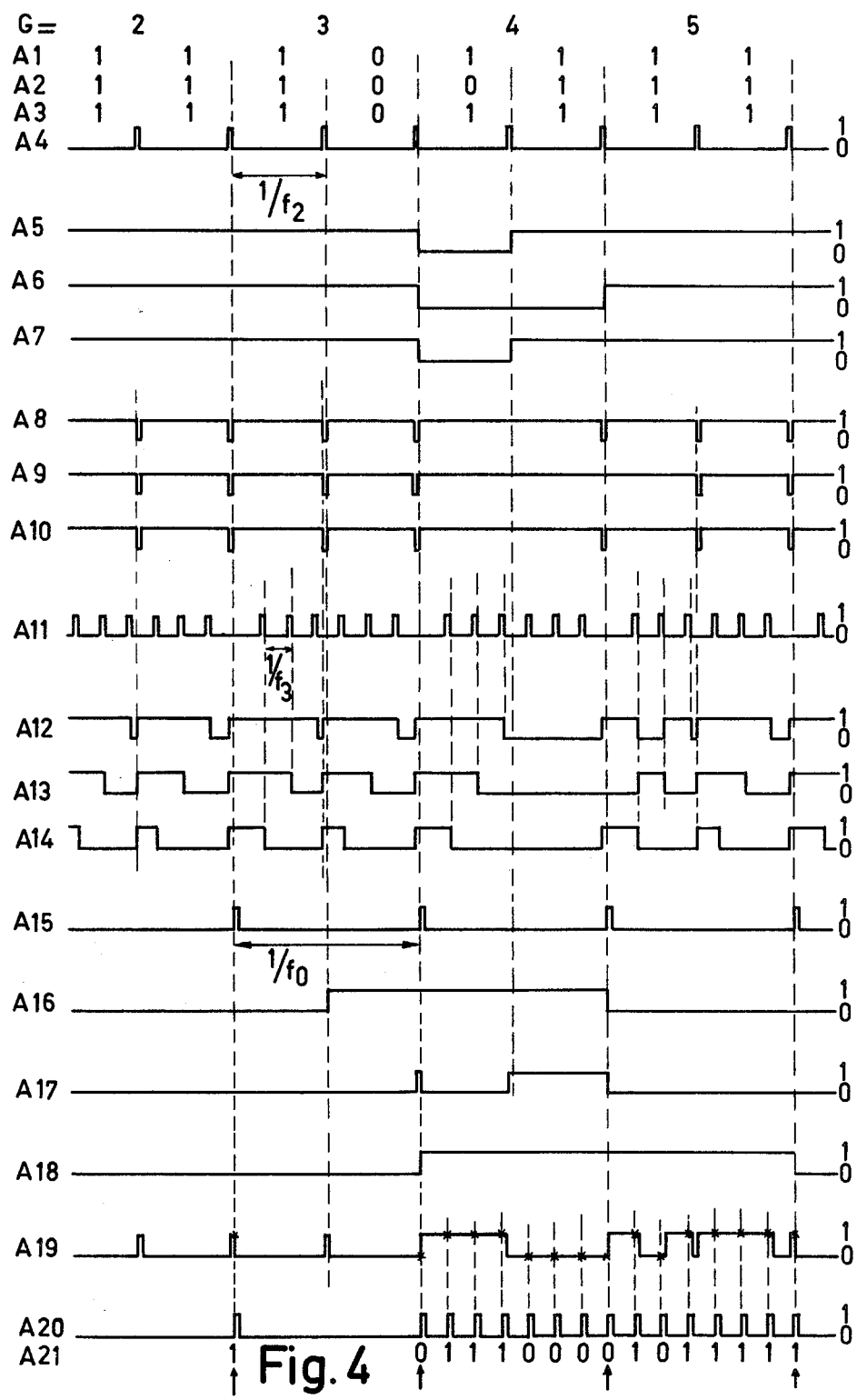
Figure 5:
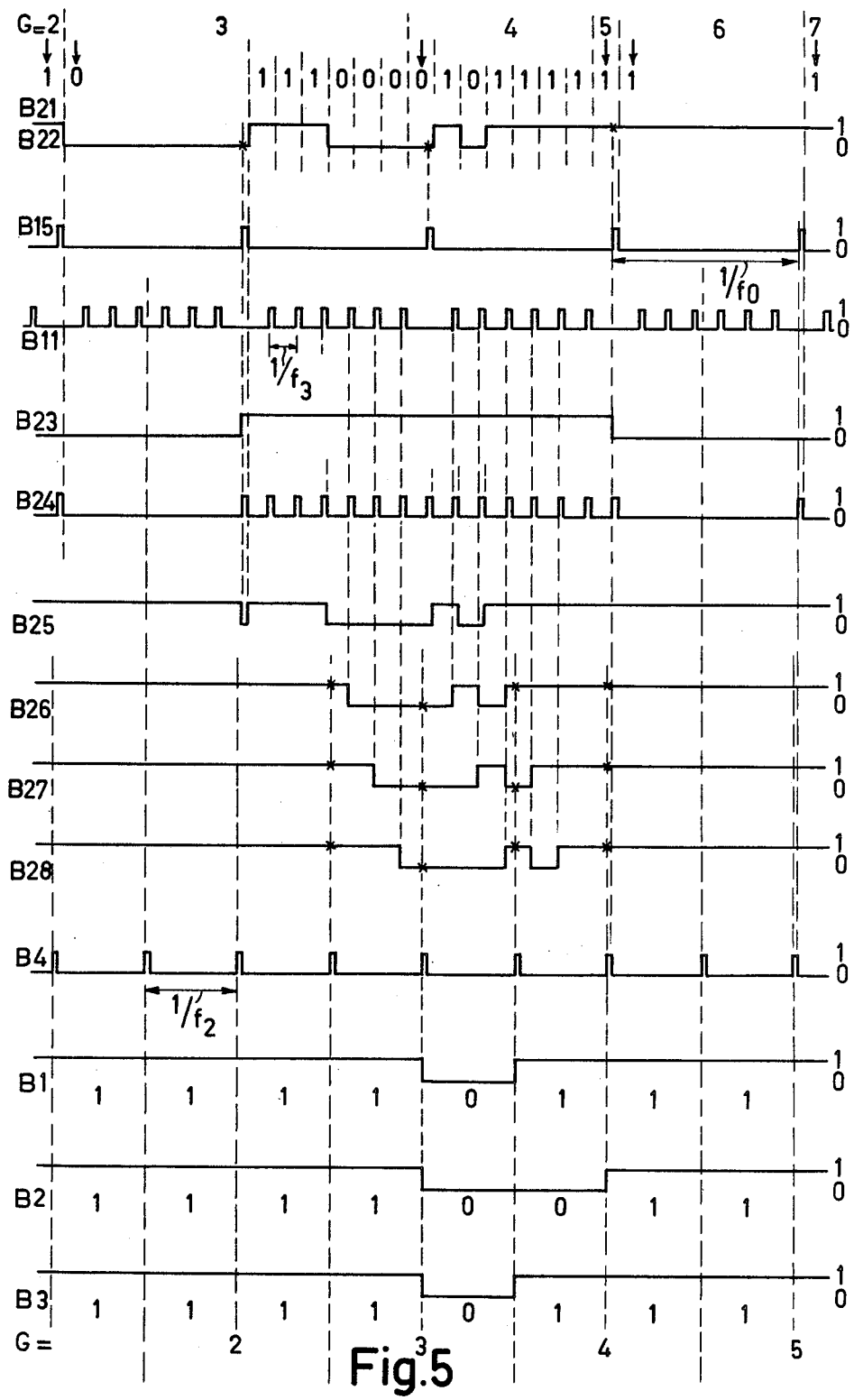
Figure 6:
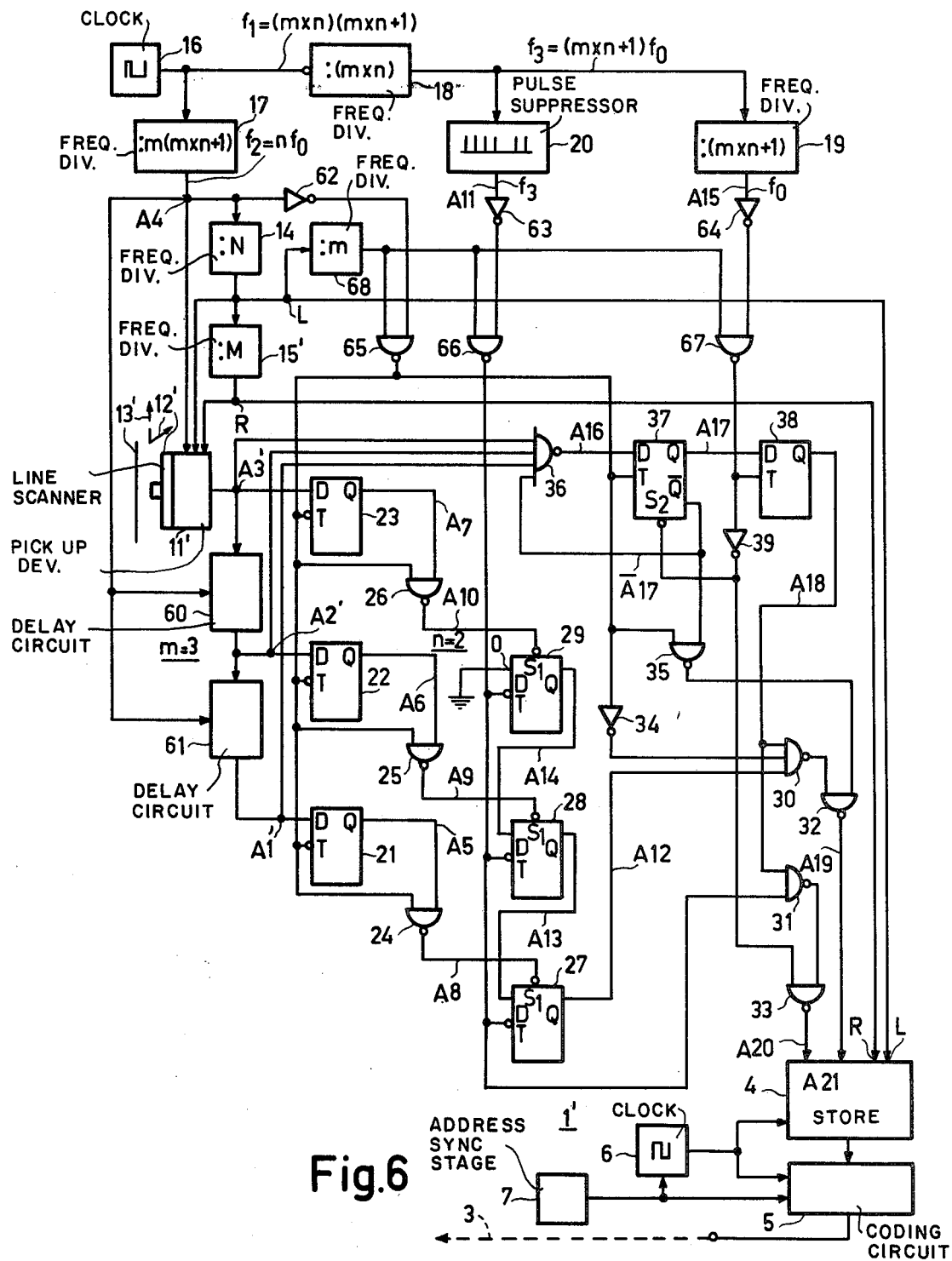
Figure 7:
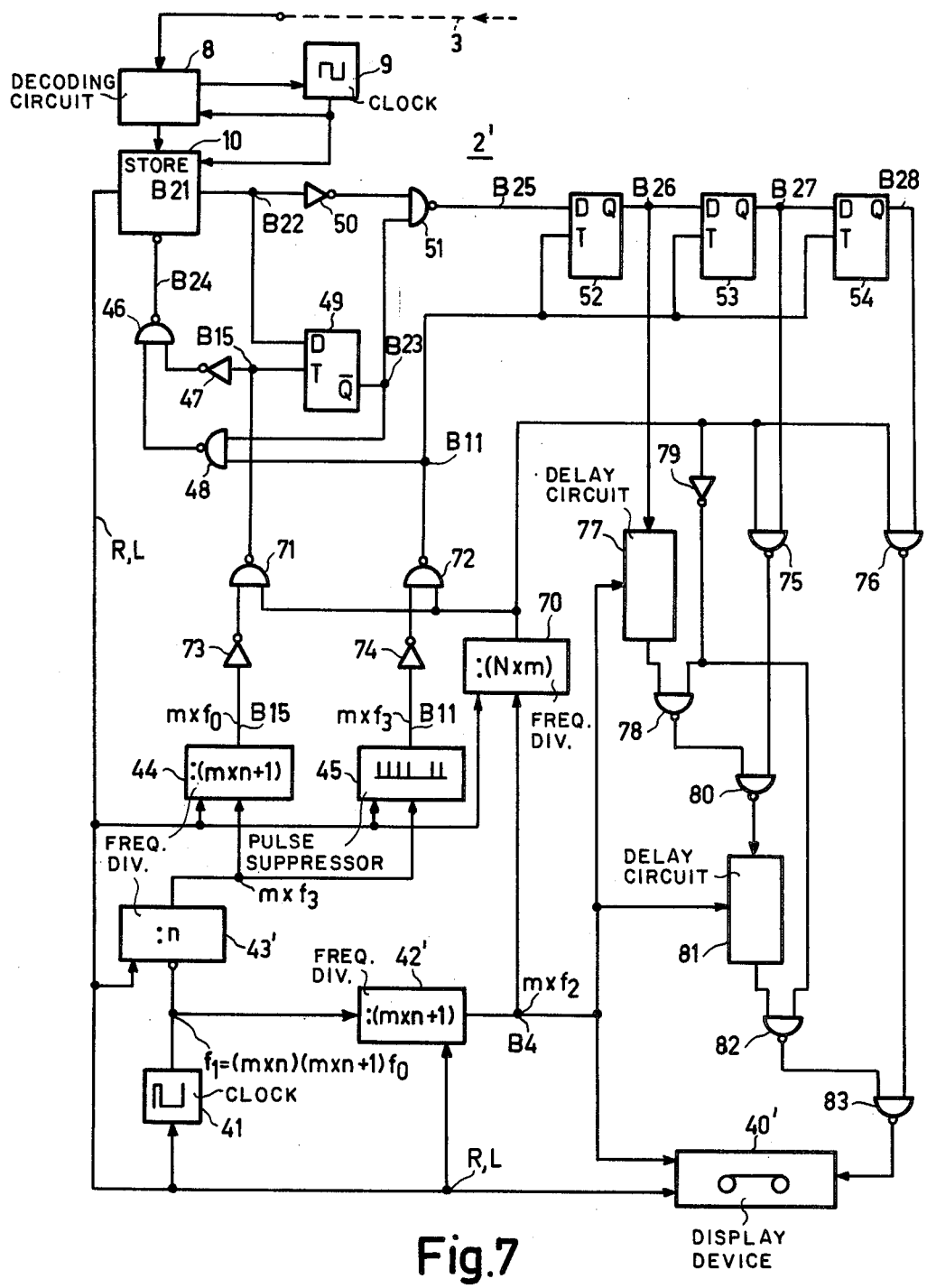

The invention will be described in greater detail by way of example with reference to the accompanying Figures in which FIG. 1 serves to illustrate the coding method in a facsimile system according to the invention, FIG. 2 shows some bit-reduction graphs associated with a sample of picture information coded in accordance with the coding method according to FIG. 1 relative to no coding with picture element comparison, FIG. 3 shows a first embodiment of a facsimile system and a picture pick-up and picture display arrangement according to the invention, FIG. 4 shows some signals as a function of time occurring in the picture pick-up arrangements according to FIGS. 3 and 6, FIG. 5 shows some signals as a function of time occurring in the picture display arrangements according to FIGS. 3 and 7, FIG. 6 shows a second embodiment of a picture pick-up arrangement according to the invention and FIG. 7 shows a second embodiment of a picture display arrangement according to the invention.

In FIG. 1 a portion of picture information to be processed in a facsimile system is shown in FIG. 1a. The picture information appears as black on a white background such as, for example, on a page of text; the other way about may alternatively be possible. FIG. 1a shows by way of small squares picture elements as they are picked up by a picture pick-up device. In the picture pick-up device a linewise pick-up is effected in the direction of an arrow denoted by N in which N gives the number of picture elements in one line. Transversely to the direction of the line an arrow denoted by M is shown in which M gives the number of picture lines in which the picture information of the entire page is picked up and processed. For performing the coding method according to the invention numbers n of adjacent picture elements are taken from numbers m of adjacent lines, which $m \times n$ picture elements are compared for the purpose of coding. In the example of FIG. 1a it has been assumed that $m=3$ and $n=2$. Instead of the number of $n=2$ alternatively one picture element of the number of m lines may be chosen. For the numbers $m$ and $n$ there applies that they may have any integral value as from the number 2. In this case it is assumed that N and M are integral multiples of $n$ and $m$, respectively.

FIG. 1a shows that the picture information is processed in groups G of $m \times n = 6$ picture elements. Two rows of the groups G of picture elements have been given with 6 groups each. Black information is present in the first row in the groups G = 3, 4 and 5 while the second row comprises black information in the group G = 3 and 4.

FIGS. 1b and 1c show signals a, b and c as they are supplied by a picture pick-up device when picking up successively the first and the second row of the picture element groups G of FIG. 1a. The simultaneously occurring signals a, b and c of FIG. 1b or 1c are, for example, generated by a picture pick-up device with a composition of three pick-up elements because this moves in the line direction across the picture information as is denoted in FIG. 1a by (arrow) 1a or 1c. In FIGS. 1b and 1c the picture element groups G are likewise denoted by 1, 2 ... 6. At the end of each picture element group G = 1, 2 ... 6 it is determined whether black information was present in at least one of the $m \times n = 6$ picture elements in the first $m = 3$ picture elements or in the last $m = 3$ picture elements. The signal d shown in FIGS. 1b and 1c serves for this purpose. The signal d indicates by way of a pulse at the end of each picture element group G = 1, 2 ... 6 whether black information is present or absent in a picture element group G and the pulse then becomes manifest in a signal e with a logical 0 or 1.

FIG. 1b shows that for the picture element groups G = 1 and G = 2 the logical 1 occurs in the signal e which likewise gives the logical 1 in a coded signal f which may be considered as a fixed code signal. At the end of the group G = 3 it is determined with the aid of the pulse in the signal d whether there is black information in this group and in the signal e the logical 0 is given. The signal d subsequently has a gating pulse shown by a broken line by which the information of the signals a, b and c is passed on for processing to a signal coder. It is found that the coding time of a group of picture elements coincides with the pick-up time of the subsequent picture element group. By indicating the black information with a logical 0 and coding the picture elements in a group always for m picture elements from the top of the bottom there follows for the group G = 3 the code 111001 for the coded signal f. At the end of the picture element groups G = 4 and G = 5 the signal d likewise produces the logical 0 in the coded signal f while subsequently thereto the respective instantaneous code signals 100110 and 110111 occur. At the end of the picture element group G = 6 the pulse in the signal d gives the logical 1 in the coded signal f which logical 1 is again the fixed code signal.

The description of FIG. 1b shows in a simple manner for FIG. 1c that a coded signal f with a code 1, 1, 0111000, 0101111, 1 is generated.

It is found that the described coding method in the absence of black information in a picture element group G of $m \times n$ picture elements gives only one logical 1 instead of a number of $m \times n$ logical 1's in the uncoded condition, and white for all picture elements. In this case it is essential for the largest bit reduction that the fixed code signal (1) for the picture elements groups G without black information is associated with a picture element group which has no picture elements in common with other groups. The row scanning of the groups G shown in FIG. 1a is to be effected in separate rows without overlapping. Likewise there applies that the groups G are processed in a row, separately and without overlapping. When black information does occur in a picture element group G a number of $(m = n + 1)$ bits is prescribed. In this case the number of $(m \times n)$ bits for the formation of the picture element code signal can be reduced. In fact, in this code signal each picture element occurs in the simplest manner with a logical 0 for black and a logical 1 for white and by not prescribing for each picture element in a group G its own bit (uncoded condition with a one-bit representation per picture element) but by applying a subcoding a lower number than $m \times n$ bits can be used. Since the invention relates in principle to the bit reduction for the picture element groups without black information a possible subcoding for the code signal is left out of consideration. In case of a white text on a dark or gray page there applies that the fixed code signal for the picture element groups must be chosen for the groups without white information.

In FIG. 1 the coded codes stored in a store are repeated in FIG. 1d which in accordance with the signals f in FIGS. 1b and 1c are generated with intermissions (1 relative to the next 1) and a given frequency (0 etc. to a subsequent 0 or 1 at the end of a picture element group G). In the store the bits are stored in successive places. Before the bit information of each row of groups of the picture information of FIG. 1a a line starting signal L is likewise stored. A possible series of logical 1's occurring immediately after the line starting signal L means that a picture element group G without black information is associated with each logical 1. The next logical 0 indicates that the $m \times n = 6$ subsequent bits are associated with an instantaneous code signal. A subsequent logical 0 is the beginning of a subsequent instantaneous code signal while a logical 1 locally gives an entire picture element group G without black information. Before the bit information of the first row of picture elements groups G of a page a raster signal R is stored together with the line starting signal L which yields a raster starting signal RL. The single raster signal R may be utilised as a raster final signal by repeating it at the end of the last row of picture element groups G on the picked-up page.

FIG. 1e shows an example of how the information stored and transmitted in accordance with FIG. 1d can be decoded for a picture display device. A logical 1 which represents a picture element group G without black information yields six 1's (white) while a logical 0 present locally activates the decoding of the subsequent instantaneous code signal. Upon display of the decoded information given in FIG. 1e the picture information shown in FIG. 1a is obtained.

To illustrate the advantage of the described coding FIG. 2 shows some bit reduction graphs. For deducing the graphs use is made of a sample of picture information as occurs in "IRE Transactions on Information Theory", June 1957, IT-3 pages 147 and 148, particularly FIG. 2 on page 148. For the said numbers there applies that N = 67 and M = 75. The lettertext is given over the entire surface of a page without a normally occurring blank space for a margin above, below or behind the text. The letter height varies between seven and 10 picture elements, the letter lines are fifteen picture elements high and the spaces between the words have six to nine picture elements.

In FIG. 2 a bit reduction factor BR is plotted as a function of the number of mxn picture elements of the groups G with the parameters m and n where for the factor BR there applies that:

$$BR = 1 - [B/(M \times N)] \tag{1}$$

where B is the number of bits which is present after coding and $M \times N$ is the number of bits without coding with a 1 for each picture element for white and a 0 for black. For those values of n and m for which the quotient N/n or M/m is not an integer the last incomplete picture element groups G at the end of a row or at the bottom of the text are not taken into consideration and the number of bits M×N is reduced proportionally thereto for the calculation of the factor BR.

The bit reduction graphs of FIG. 2 show that for the considered sample of picture information a bit reduction factor BR of up to approximately 0.4 occurs for $m \times n$ located between 4 and 8 and particularly the graph with the parameter $n=2$ is found to be favourable in this case. Furthermore it is found that for large values of $m$ (for example $m=5$) the bit reduction factor BR as a parameter decreases more quickly than for the same value of n as a parameter. All this means that there is a dependance of direction in the coding of $m \times n$ picture elements, that is to say, the numbers m and n yield different factors BR in case of an exchange in the same number $m \times n$.

Since the influence cannot be derived from the graphs obtained through the sample of picture information of FIG. 2 of the blank spaces as they occur normally around the text on a page the following calculation is given for an indication thereof.

Starting from M×N picture elements on the page of text (M×N) (m×n) picture element groups G may be formed therefrom; in this case it is assumed that N and M are integral multiples of $n$ and $m$, respectively. For example a part of $a$ groups comprises black information and the remaining part of $(1-a)$ groups only has white information (for example the said blank space). The ax (M×N)/(m×n) groups with black information yield ax (M×N)/(m×n) (1+m×n) bits after coding. The $(1-a) \times$ (M×N)/(m×n) groups with white information only yield a number of bits equal thereto. It follows that for the total number of bits B after coding there applies that $$B = ax \frac{M \times N}{m \times n} (1 + m \times n) + (1 - a) \times \frac{M \times N}{m \times n} \quad (2)$$

and for the given reduction factor BR (1) there follows that $$BR = 1 - \frac{B}{M \times N} = 1 - (a + \frac{1}{m \times n}) \quad (3)$$

It is found that for obtaining the largest possible bit reduction factor BR it is favourable to make the number m×n as large as possible, but the graphs of FIG. 2 show that a portion of text on a page sets a limit thereto.

For a blank page or a part thereof for which there applies that $a=0$ there follows that $$BR = 1 - [1/(m \times n)] \quad (4)$$

The formula (4) is plotted as graph (4) in FIG. 2.

With the aid of the graphs of FIG. 2 relating on the one hand to a portion of text on a page (parameters $m$ and $n$) and relating on the other hand to the blank portions (graph (4) an estimation can be made for the bit reduction factor BR for the page with text and blank parts. It is assumed that 1/5 part of a page is blank and 4/5 part is provided with spaced text. Furthermore it is assumed that $n=2$ and $m=3$ with m×n=6. It follows from Formula (4) and the graph (4) of FIG. 2 that BR=5/6 for the blank part. It follows from the graph of FIG. 2 with $m \times n=6$ and $n=2$ that BR=0.402 for the text part. With the factors 1/5 and 4/5 there follows that:

$$BR = 1/5 \times 5/6 + 0.8 \times 0.402 = 0.488 \quad (5)$$

for the sample page with text and blank parts. A considerable bit reduction is thus found to be possible. When using a further subcoding of the instantaneous code signal, a further bit reduction is the result.

The bit reduction graphs given in FIG. 2 with the parameters $m$ and $n$ apply in principle only to the given sample of picture information. For another letter shape and text composition on the page other bit reduction graphs will apply. To process the picture information in the most favourable manner a given choice is necessary for the numbers $m$ and $n$ as a function of the given information pattern. For determining the optimum bit reduction a trial pick-up and processing of a given picture information can be considered. After trial pick-up and a statistic examination the optimum m and n may be chosen.

FIG. 3 shows a facsimile system formed with a picture pick-up arrangement 1 and a picture display arrangement 2 according to the invention which are coupled together through a transmission path 3. The picture pick-up arrangement 1 is provided with a store 4 for storage of the bit information given in FIG. 1d. The store 4 of the picture pick-up arrangement 1 is connected to the transmission path 3 through a transmitter coding circuit 5 in which the store information is introduced under the control of a transmitter clock pulse source 6. The transmitter coding circuit 5 and the transmitter clock pulse source 6 are controlled by a transmitter addressing synchronizing stage 7. The facsimile transmitter thus formed (5, 6, 7) may be formed in any possible manner: the specific embodiment is irrelevant for the invention. For adaptation to the transmission path 3 special transmitter code techniques may be used. Likewise irrelevant for the invention is the given transmission path and a receiver decoding circuit 8 coupled thereto from which address and synchronizing information is derived by a receiver clock pulse source 9 which provides receiver clock pulses for the receiver decoding circuit 8 and a store 10 connected thereto for storage of the received and decoded transmitter information. The information in the store which forms part of the picture display arrangement 2 according to the invention is given by the bit information of FIG. 1d likewise as that in the store 4 of the picture pick-up arrangement 1.

The store 4 is disclosed in U.S. Pat. Nos. 3,571,505, 3,580,999, and 3,483,317 as elements 115, 28, and 305 respectively. The coder 5 is disclosed in said U.S. patent as elements 124, 31, and 307 respectively. The clock 6 and addressing stage 7 are disclosed in the first two recited of said patents as elements 113 and 13 respectively. The decoder 8 is disclosed in the first and third recited patents as elements 200 and 311 respectively. The clock 9 is disclosed in the first recited patent as element 205. The store 10 is disclosed in said first and third recited patents as elements 203 and 313 respectively. In addition, U.S. Pat. No. 3,726,993 discloses as element 15 and in column 4, lines 35–67 elements 4–7, particularly coder 5 and as element 21, in column 11, lines 62–67, and in column 12, lines 48–61 elements 8–10, particularly clock 9.

The picture pick-up arrangement 1 of FIG. 3 is formed with a picture pick-up device 11 provided with a scanner 12 including three pick-up elements ($m=3$) according to FIG. 1a. The scanner 12 may be denoted as a multi-line scanner or a row scanner. The scanner 12 is directed onto picture information denoted by 13. As described with reference to FIG. 1a the scanner 12 is moved, for example, in the direction shown in FIG. 3 in front of and along the picture information 13 while between the end of a row scan and the beginning of a subsequent row scan the picture information 13 with $m=3$ picture elements is moved on. Instead of a moving scanner 12 three line rows of discrete pick-up elements with associated time division multiple systems might be considered to successively process the information of the pick-up elements of a line row. The picture information 13 which is, for example, a page of text is picked up line by line and row by row by the picture pick-up device 11 which lines and rows constitute a raster of M lines and M/m rows. Three outputs are denoted by $m=3$ for the picture pick-up device 11 at which outputs the three picture element signal values are simultaneously available.

For the line and field synchronisation of the picture pick-up device 11 the signals L and R described with reference to FIG. 1d are applied thereto. The line starting signal L is derived from a frequency divider 14 and the raster signal R is derived from a frequency divider 15 connected thereto with a division number equal to M/m. The frequency divider 14 has a division number N so that a signal with picture element frequency pulses must be applied to its input, as will in fact be effected. The signals L and R are furthermore applied to the store 4 to realise the signal built up in the store 4 as shown in FIG. 1d.

The picture pick-up arrangement 1 is formed with a clock pulse source 16 having a specially chosen clock frequency of $f_1 = (m \times n)(m \times n+1)f_o$. A first frequency divider 17 having a division number of $m(m \times n+1)$ is connected to the clock pulse source 16 so that a signal with pulses is supplied at a frequency $f_2 = nf_o$. In FIG. 4 a number of signals A1, A2 . . . A21 are plotted as a function of time as they occur in the picture pick-up arrangement 1 of FIG. 3. Some signals such as A1, A2, A3 and A21 are denoted by a logical 1 and 0 while the other signals are graphically plotted between the logical values 1 and 0. In FIG. 4 the signal A4 is plotted which is supplied by the frequency divider 17. In the signal A4 narrow positive going pulses occur with a period of $1/f_2$ in which the frequency $f_2$ is the picture element frequency. Therefore the signal A4 is applied to the frequency divider 14 and to the picture pick-up device 11 for synchronisation of the picture element scanning.

The width of the narrow pulses in the signal A4 conforms to that occurring in the clock pulses asymmetrically formed in a clock period and for the shown clock pulse in the clock pulse source 16 of FIG. 3 there follows that the divider 17 is active on a leading pulse edge. Furthermore a second frequency divider 18 having a division number of $(m \times n)$ is connected to the clock pulse source 16 so that this second frequency divider supplies a signal with a pulse frequency of $f_3 = (m \times n+1)f_o$. A small circle at the input of the divider 18 indicates that the divider is active on trailing pulse edges and thus provides broad pulses which are furthermore positively directed. A frequency divider 19 having a division number of $(m \times n+1)$ follows the divider 18 so that pulses with a frequency of $f_o$ occur at its output. The frequency $f_o$ is the picture element group frequency. The output signal from the divider 19 is denoted by A15 in FIG. 4. A comparison between the signals A15 and A4 shows that the broad pulses in the signal A15 follow the narrow pulses in the signal A4. The frequency dividers 18 and 19 jointly constitute a third frequency divider (18, 19) connected to the clock pulse source 16.

It can be concluded from the division numbers $m(m \times n+1)$ and $(m \times n)$ of the respective dividers 17 and 18 connected to the clock pulse source 16 that alternatively a clock frequency which is a factor of m lower can be chosen $(n(m \times n+1))$. The choice of the higher frequency $f_1 = (m \times n)(m \times n+1)$ is made to utilise the clock pulse shape in the manner described with its leading and trailing pulse edges for the generation of the (broad) picture element group frequency pulses in the signal A15 and the (narrow) picture element frequency pulses in the signal A4. The joint duration of the two pulses is equal to the clock pulse period while the leading edges of the pulses in the signal A15 exactly coincide with the trailing pulse edges in the signal A4 which is ensured by the choice of the higher clock frequency. Alternatively the pulses in the signals A4 and A15 may give the same pulse width by causing the clock pulse to be symmetrical over one period.

A selective pulse suppressor 20 supplying the signal A11 of FIG. 4 is connected to the frequency divider 18. Every seventh $(=m \times n+1)^{th}$ pulse in the signal A11 of pulses occurring at the frequency $f_3$ is suppressed, which pulse would coincide with that occurring in the signal A15. The selective pulse suppressor 20 thus supplies groups of pulses. The pulse suppressor 20 might be constructed as a so-called exclusive OR gating circuit to which the frequency dividers 18 and 19 are connected. The dividers 17, 18 and 19 and the selective pulse suppressor 20 may be formed in known manners and it is only important that the control signals A4, A11 and A15 shown in FIG. 4 are generated.

Under the control of the signals A4, L and R picture pick-up device 11 generates the signals A1, A2 and A3 at its $m=3$ outputs. In FIG. 4 the signals A1, A2 and A3 are given with their binary code and a comparison with FIG. 1c particularly with the signal f shows that these signals correspond to the picture element groups $G=2$, 3, 4 and 5. The outputs conveying the signals A1, A2 and A3 are connected in FIG. 3 to preparatory inputs (D) of flipflops 21, 22 and 23. The flipflops 21, 22 and 23 being of the so-called D type are furthermore provided with trigger inputs T which are connected together and to the frequency divider 17 conveying the signal A4. Furthermore the D flipflops are provided with two general set and resets inputs ($S_1$ and $S_2$, respectively) which are not shown in this case because they are not further connected. At the trigger inputs T a small circle shows that the trigger action is activated by trailing pulse edges; without a circle leading pulse edges would have the trigger function. The D flipflops are further generally formed with two outputs Q and T while the stripe notation denotes an inverse signal occurring thereon.

Generally there applies for D flipflops that the Q output acquires or retains the logical value (0 or 1) occurring at the D input when a trigger pulse appears at the T input. In case of an external non-connected S input it conveys, due to internal couplings, the logical 1 and a logical 1 does not influence the action of the flipflop while a logical O at an S input occurs in a dominant manner independent of what occurs at the T and D inputs and gives a logical 1 (set input S1) or a logical O (reset input S2) at the Q output.

It follows from the foregoing that with the code signals A1, A2 and A3 at the D inputs of the respective flipflops 21, 22, 23 and the signal A4 at the T inputs the signals A5, A6 and A7 are obtained at the Q outputs. The Q output of the flipflop 21 conveying the signal A5 is connected to an input of a NAND gate 24 another input of which is connected to the output of the divider 17 conveying the signal A4. The respective flipflops 22 and 23 are likewise combined with respective NAND gates 25 and 26. Generally there applies for the logical function of the NAND gates that the output only conveys a logical 0 when the logical 1 occurs at all inputs. For the gating function there follows that when assuming an input signal to be a gating signal the gate is blocked when the gating signal has the logical 0 while a logical 1 occurs at the output and the gate is open at a gating signal with the logical 1 while the other continuing input signal inversely occurs at the output. Thus it follows from the signals A5, A6 and A7 considered as gating signals and the signal A4 considered as the input signal to be passed that the signals A8, A9 and A10 shown in FIG. 4 appear at the outputs of the gates 24, 25 and 26. The outputs of the gates 24, 25 and 26 are connected to $S_1$ inputs of D flipflops 27, 28 and 29, respectively. The T inputs of the flipflops 27, 28 and 29 are connected together and to the output of the selective pulse suppressor 20 conveying the signal A11. The flipflops 27, 28 and 29 are active with negative going pulse edges on the T inputs and with a logical following a negative going pulse edge at the $S_1$ inputs. The D input of the flipflop 29 is connected to ground while the ground potential corresponds to the logical 0. The Q outputs of the flipflops 29 and 28 are connected to the D inputs of flipflops 28 and 27, respectively. In the row of series-arranged flipflops 27, 28 and 29 thus formed the signals A12, A13 and A14 are denoted at the Q outputs. The flipflops 21, 22, 23, 27, 28 and 29 and the gates 24, 25 and 26 are active as a parallel series convertor (21-29) with the simultaneously occurring signals A1, A2 and A3 being applied to m=3 inputs, while a single output signal A12 becomes available at the single output namely the Q output of the flipflop 27. For the given example with n=2 there are two groups of flipflops 21, 22 23 and 27, 28, 29. For n=3 this group of flipflops 21, 22 and 23 would have to be followed by the same group. For n=1 it is sufficient to use a single row of flipflops (27, 28, 29).

The signals shown in FIG. 4 prove that a pulse in the signals A8, A9 and A10 at the $S_1$ input of the flipflops 27, 28 and 29 after the negative going pulse edge gives the logical 1 at the Q outputs whereafter the next pulse in the signal A11 at the T inputs with the negative going pulse edge gives the logical 0 in the signal A14 and the second and third pulses give the logical 0 in the signals A13 and A12, respectively. The instantaneous absence of one of the set pulses in the signals A8, A9 and A10 under the influence of the gating pulses in the signals A5, A6 and A7 involves code information which ultimately becomes availabe in the signal A12.

The Q output of the flipflop 27 is connected to an input of an NAND gate 30. A second input of the gate 30 is connected to an input of a NAND gate 31 to which interconnected inputs a gating signal to be described hereinafter is applied. A second input of the gate 31 is connected to the output of the selective pulse suppressor 20 providing the signal A11. The outputs of the gates 30 and 31 are connected to inputs of NAND gates 32 and 33, respectively. The outputs of gates 32 and 33 are connected to inputs of the memory 4 intended for storage of the picture information. A third input of the gate 30 is connected to the output of a signal inverter 34 whose input is connected to the output of the frequency divider 17 conveying the signal A4, which output is furthermore connected to an input of a NAND gate 35 whose output is connected to a second input of the gate 32. In the picture pick-up arrangement 1 a signal coder (21-35) is thus formed in which not only the parallel series converter (21-29) but also a first gating circuit (30, 31) and a second gating circuit (32-35) occur. Prior to describing the operation of the signal coder (21-35) the further components of the picture pick-up arrangement 1 will be described.

In FIG. 3 the m=3 outputs of the picture pick-up device 11 conveying the signals A1, A2 and A3 are connected to inputs of a NAND gate 36. The output of the gate 36 conveying the signal A16 of FIG. 4 is connected to the D input of a flipflop 37. The $\overline{Q}$ output of the flipflop 37 conveying an inverse signal $\overline{A17}$ is connected to a fourth input of the gate 36 and to a second input of the gate 35. The T input of the flipflop 37 is connected to the output of the frequency divider 17 conveying the signal A4. The Q output of the flipflop 37 conveying the signal A17 is connected to the D input of a flipflop 38 whose T input is connected to the output of the frequency divider 19 conveying the signal A15, while this output is furthermore connected through a signal inverter 39 to the $S_2$ output of the flipflop 37 and to the second input of the gate 33. The Q output of the flipflop 38 conveys a signal A18 which is applied as a gating signal to the interconnected inputs of the gates 30 and 31. The picture pick-up arrangement 1 of FIG. 3 is thus formed with a picture element comparison circuit (36, 37, 38) in which the indicated comparison signals A16, A17 and A18 occur and which particularly provides the comparison signal A18 as a gating signal to the signal coder (21-35). The outputs of the gates 32 and 33 of the signal coder (21-35) convey the respective signals A19 and A20 which yield the code signal A21 in the store 4.

For a detailed explanation of the operation of the signal coding circuit (16-39) the following applies. In the picture element group G=2 of FIG. 4 no black information occurs at the picture element signal values. In the picture element comparison circuit (36, 37, 38) of FIG. 3 the logical 0 occurs in the signal A16 present at the output of the gate 36 because the logical 1 occurs at the inputs conveying the signals A1, A2 and A3 which logical 1 is likewise supposed to be present at the input conveying the signal $\overline{A17}$. In the stable state of the flopflop 37 conveying the logical 0 in the signal A16 at the D input the logical 0 at the Q output likewise occurs in the signal A17. This stable state is not influenced by both the pulses in the signal A4 at the T input and the pulses in the signal $\overline{A15}$ at the $S_2$ input. The supposed logical 1 in the signal $\overline{A17}$ at the input of gate 36 is found to be present while the gate 35 is enabled. The logical 0 in the signal A17 at the D input of the flipflop 38 causes this flipflop to be in the stable state with a logical 0 in the comparison signal A18 at the Q output; in this case the gates 30 and 31 constituting the said first gating circuit (30, 31) in the signal coder (21-35) are blocked. The logical 1 emanating therefrom at the outputs of the gates 30 and 31 enables the gates 32 and 33 which are present in the said second gating circuit (32-35) of the signal coder (21-35). For the picture element group G=2 there follows that the pulses occurring in the signal A4 occur through the gates 35 and 32 in the signal A19 while the pulses in the signal A15 occur through the inverter 39 and the gate 33 in the signal A20. At the leading edge of the picture element group pulse in the signal A20 of FIG. 4 the trailing edge of the picture element pulse occurring with the logical 1 in the signal A19 occurs so that the code signal A21 written in the store 4 gives the logical 1 in a store position. The signal A20 may be considered as a clock pulse signal for the store 4 while the signal A19 comprises the code information for storage.

In the picture element group G=3 no black information occurs in the first picture element period ($1/f_2$) so that the same signals as described for the picture element group G=2 occur during this period. After the trailing edge of the picture element pulse in the signal A4 the logical 0 giving the black information occurs in the signals A1, A2 and A3. The gate 36 in the picture element comparison circuit (36, 37, 38) thus gives the logical 1 in the signal A16. The logical 1 in the signal A16 at the D input of the flipflop 37 need not exactly occur at the instant shown but may alternatively appear later. However, the logical 0 in the signals A1, A2 and A3 must be present before the leading edge of the picture element pulse in the signal A4 occurring at the end of the pick-up time of the picture element group G=3. In fact, the logical 1 in the signal A16 present at the D input of the flipflop 37 is passed on to the Q output by the triggering action on the T input. Immediately thereafter the picture element group pulse occurs in the signal A15 which is active through the inverter 39 at the reset input $S_2$ and which resets the flipflop 37. At the end of the pick-up time of the group G=3 the (narrow) pulse shown occurs in the signal A17 which pulse occurs with a logical 0 in the inverse signal $\overline{A17}$ so that the gate 35 is blocked. The picture element pulse in the signal A4 occurring just before the end of the pick-up time of the group G=3 is therefore not passed; the two blocked gates 35 and 30 give the logical 0 in the signal A19 at the output of the gae 32. The leading edge of the picture element group pulse of the signal A15 occurs in the signal A20 of FIG. 4 because the gate 33 is enabled by the logical 1 at the output of the gate 31 which is given by the logical 0 in the signal A11 applied thereto. Consequently a logical 0 occurs in the signal A21 indicating than an instantaneous code signal will follow as a function of the various picture element signal values occurring in the picture element group G=3. The coding time for the group G=3 then coincides with the pick-up time of the group G=4.

The derivation of the instantaneous code signal is effected as follows. The narrow pulse conveying the logical 1 in the signal A17 occurring at the end of the pick-up time of the picture element group G=3 is present at the D input of the flipflop 38 and the logical 1 is passed on to the Q output at the leading edge of the picture element pulse in the signal A15. The said narrow pulse in the signal A17 ensures that during the pick-up time of the next picture element group G=4 the logical 1 is present in the signal A18. The flipflop 38 us active as a store in the picture element comparison circuit (36, 37, 38). The gates 30 and 31 in the gating circuit (30, 31) are enabled by the logical 1 in the signal A18. The pulses of the signal A11 the six of them are active as clock coding pulses in the store 4 occur in the signal A20 through the gate 33 with the logical 1 in the signal $\overline{A15}$ apply thereto during the remaining pick-up time of the group G=4. The signal A12 gives through the enabled gate 30 and the gate 32 the contribution in the signal A19 which is important for coding the group G=3 during the pick-up time of the group G=4. It is found from the signals A19 and A20 which are present during the pick-up time of the group G=4 that the instantaneous code signal 111000 follows the given logica 0 in the coded signal A21 for the group G=3.

The picture element group G=4 with black information has influenced the signal A19 of FIG. 4 during its pick-up time in the middle and at the end thereof. In fact, when the group G=4 has no black information, the pulse in the signal A16 will terminate at the end of the pick-up time of the group G=3 while in the signal A17 only the described narrow pulse and not a broad pulse to be described occurs. The pulse in the signal A18 terminates at the end of the pick-up time of the group G=4. The result would be that as is shown for the pick-up times of the group G=2 and G=3 at the signal A19 a narrow pulse occurs at the central instant which pulse is supplied through the then enabled gates 35 and 32. In fact, the signal $\overline{A17}$ conveying the logical 1 enables the gate 35 and the logical 0 in the signal A12 passes the logical 1 to gate 32. Since the then occurring pulse in the signal A19 falls between the third and fourth clock coding pulses, coding is not influenced.

The difference between the signal A19 and the signal A12 shown in FIG. 4 just before the end of the pick-up time of the group G=4 is, however, essential. When the signal A12 locally occurs in an identical manner in the signal A19, this means that the logical 1 in the signal A19 would be present when the pulse in the signal A15 occurs through the inverter 39 and the gate 33 in the signal A20; a logical 1 would occur in the coded signal A21. Since the group G=4 comprises black informatiion the logical 1 would involve erroneous information. The logical 1 generated in the manner described occurs at the end of the pick-up time of the group G=5 and has its right place there.

To explain the coding of the picture elements of the group G=4 with black information present, reference is made to the unchanged features given in FIG. 4. Black information is only present at the picture element group G=4 in the first half of the pick-up time of the group. Consequently in case of a single supply to the gate 36 of the signals A1, A2 and A3 each having the logical 1 after the middle instant the logical 0 would occur in the signal A16 if it were not for the logical 0 to occur just before that instant in the signal $\overline{A17}$ applied to the gate 36 under the control of the pulse leading edge in the signal A4 on the T input. The feedback of the Q output of the flipflop 37 to the gate 36 has a memory function so that the influence of the black information only occurring during the first half of a picture element group extends as far as the end of the pick-up time of the group. This is essential because of the leading edge of the picture element group pulse occurring at the end of each group fixes the instant of determining the logical 1 (only white information) or the logical 0 (black information present). Without the feedback the pulse trailing edge would occur in the signal A16 at the middle instant during the pick-up time of the group G=4, so that the leading edge of the pulse in the signal A14 occurring before the end of the pick-up time of the group G=4 on the T input of the flipflop 37 gives the logical 0 in the signal A17. However, since at this instant the logica 1 must occur in signal A17 so as to pass it on in the signal A18 after the pulse leading edge in the signal A15 on the T input of the flipflop 38, the feedback with the signal $\overline{A17}$ is provided. When black information occurs both in the first and the second half of a pick-up time of a group G, the feedback does not have any influence and the signals A1, A2 and A3 directly give the pulse of the signal A16 covering an entire pick-up period.

The signal $\overline{A17}$ furthermore ensures that the logical 0 at the end of the pick-up time of the group g=4 blocks the gate 35 and enables the gate 32 through a logical 1. The use of the inverter 34 ensures that in case of a gate 30 enabled by the signal A18 and a logical 1 in the signal A12 the picture element frequency pulse in the signal A4 occurs inversely in the signal A19 so that the required logical 0 is present at the end of the pick-up time of the group G=4. The subsequent coding of the picture element signal values yields the instantaneous code signal 101111.

The coded signal A21 stored in the store 4 of the picture pick-up arrangement 1 is present with the same code in the store 10 of the picture display arrangement 2 and is denoted by the signal B21 which is shown as a coded signal with 1's and 0's in FIG. 5. The stores 4 and 10 may be identical. The signals given in FIG. 5 are denoted by B and signals corresponding to the signals A of FIG. 4 are denoted by the same numbers and plotted in the same manner. For the coded signal B21 the bits are grouped which are indicated by the groups G=2, 3 ... 7 which they represent.

The raster start signal RL, the line start signal and the raster (end) signal R (signals R, L) for synchronizing purposes are derived from the store 10 through an internal read clock pulse source present at the store 10 or the receiver clock pulse source 9 in a manner which is further irrelevant. The signals R, L are applied to a picture display device 40, a clock pulse source 41, to a first frequency divider 42 and a second frequency divider 43 connected to the clock pulse source 41, furthermore to a frequency divider 44 connected to the second divider 43, (together forming a third frequency divider (43, 44)) and to a further selective pulse suppressor 45 connected thereto. The clock pulse source 41 of the picture display arrangement 2 provides clock pulses which are identical in shape and frequency ($f_1$) to those delivered by the clock pulse source 16 of the picture pick-up arrangement 1. Likewise the respective frequency dividers 42, 43 and 44 and the pulse suppressor 45 are identical to those (17, 18, 19 and 20) given in the picture pick-up arrangement 1. The signal B4 provided by the divider 42 with pulses having the picture element frequency $f_2$ is applied for synchronisation to the picture display device 40.

A read input of the store 10 is connected to the output of a NAND gate 46 while pulse edges having a negative going edge occurring thereacross realise reading of the store 10. An input of the gate 46 is connected to the output of the signal inverter 47 to which the signal B15 is applied which originates from the frequency divider 44 and has pulses with the picture element group frequency $f_o$. The second input of the gate 46 is connected to the output of a NAND gate 48. An input of the gate 48 is connected to the output of the selective pulse suppressor 45 which produces in the signal B11 groups of mxn=6 pulses having a repetition period of $1/f_3$. A second input of the gate 48 is connected to a $\overline{Q}$ output of a D flipflop 49 whose T input receives the signal B15 which may be active with positive going pulse edges at the flipflop 49. The D input of the flipflop 49 is connected to a bit-read output of the store 10 which is furthermore connected through a signal inverter 50 to an input of a NAND gate 51 whose second input is connected to the $\overline{Q}$ output of the flipflop 49. The picture display arrangement 2 is thus formed with a store-read stage (46-51) in which a first gating circuit (46, 47, 48) and a second gating circuit (50, 51) occur.

The output of the gate 51 is likewise the output of the read stage (46-51) and is connected to a D input of a flipflop 52. The Q output of the flipflop 52 is connected to the D input of a flipflop 53 whose Q output is connected to the D input of a flipflop 54. Of the row of flipflops 52, 53 and 54 and T inputs are connected together and to the output of the selective pulse suppressor 45 supplying the signal B11. The Q outputs of the flipflops 54, 53 and 52 are connected to the D inputs of flipflops 55, 56 and 57, respectively. The T inputs of the flipflops 55, 56 and 57 are interconnected and are connected to the frequency divider 42 supplying the signal B4. The Q outputs of the flipflops 55, 56 and 57 are connected to the same number of inputs of the picture display device 40. The flipflops 52 to 57 constituting a signal decoder (52-57) have a triggering action subsequent to a positive going pulse edge in the signal B11 or B4. In the signal decoder (52-57) the row of flipflops 52, 53 and 54 is active as a series parallel converter (52, 53, 54). The signal decoder (52-57) is given for m=3 and n=2. In case of a variation of the number m the number of flipflops in the rows 52, 53, 54 and 55, 56, 57 must be adapted while the number n determines the number of rows. For n=1 a series parallel converter having a single row of flipflops 52, 53 and 54 may be considered.

To explain the operation of a signal decoding circuit (41-57) thus formed in the picture display arrangement 2 the following applies. The starting point is that in the coded signal B21 in the store 10 a logical 1 occurs representing a group of picture elements without black information, for example, the groups G=2, 5, 6 and 7. Corresponding thereto the logical 1 in a signal B22 shown in FIG. 5 occurs at the read output of the store 10. The picture element information of the logical 1 representing the group G=2 is processed in the signal decoding circuit (41-57) during the period of $1/f_o$ subsequent to the first shown pulse in the signal B15. For the logical 1 of the picture element group G=5 and G=6 there applies that they are processed after the shown fourth and fifth pulses in the signal B15. With this processing of the logical 1 information of the groups G=2, 5, 6 etc., the logical 0 occurs in a signal B23 on the $\overline{Q}$ output of the flip-flop 49. The logical 0 in the signal B23 blocks the gates 48 and 51. Blocking of the gate 48 prevents the pulses of the signal B11 from occurring in a signal B24 occurring at the output of the gate 46. In the signal B24 only the pulses of the signal B15 occur which act with the negative going pulse edge on the read input of the store 10 and give in the signal B22 the instantaneous value which is determined by the logical 1 or 0 in the coded signal B21. The logical 0 of the group G=3 follows the logical 1 of the group G=2 while the logical 1 of the group G=5 is followed by that of the group G=6 and subsequently of the group G=7. During processing shown in FIG. 5 of the logical 1 information of the groups G=2 and G=5 blocked gate 51 gives the logical 1 in a signal B25 at the output. The logical 1 in the signal B25 at the D input of the flipflop 52 is passed on, if it is not already present there, by the first pulse in the signal B11 at the T input subsequent to the pulse in the signal B15 to the Q output where a signal B26 occurs. After the second and third pulses in the signal B11 the logical 1, if neither present already, occurs at the Q output of the flipflops 53 and 54 conveying signals B27 and B28. The pulse in the signal B4 applied to the T inputs of the flipflops 55, 56 and 57 occurs after the third pulse of the groups of six pulses in the signal B11 so that the logical 1 at each D input is passed on, if not already present there, to the respective Q outputs at which the signals B1, B2 and B3 occur for supply to the picture display device 40. The foregoing is repeated for the fourth, fifth and sixth pulse group in the signal B11 with information being passed on in the series parallel converter (52, 53, 54) and making information to be displayed available by the next pulse in the signal B4 at the T inputs of the flipflops 55, 56, 57. In the signals B1, B2 and B3 intended for display the described picture elements groups to be displayed are denoted by G=2 and G5 in FIG. 5 in which the 1's stand for white information. Since prior to the processing of the information of the groups G=2 and G5 the white information with the logical 1 was already present in the signals B25, B26, B27, B28, B1, B2 and B3 no signal variation of the Q outputs have occurred in the flipflops 52 through 57.

In the coded signal B21 the logical 0 of the group G=3 follows the logical 1 of the group G=2 which indicates that in a number of subsequent bits a derived code signal for the picture element signal values follows. The negative going edge of the pulse in the signal B24 which pulse is supplied by the signal B15 gives the logical 0 in the signal B22. The next pulse in the signal B15 is active with its positive going edge on the T input of the flipflop 49 so that with the logical 0 at the B input the logical 1 occurs in the signal B23 at the Q output. This logical 1 in the signal B23 remains present until the leading edge of the next pulse occurs in the signal B15 of the T input of the flipflop 49. FIG. 5 shows that at the third pulse in the signal B15 the logical 0 of the group G=4 occurs in the signal B22 so that for the subsequent picture element group period $1/f_o$ the logical 1 is maintained in the signal B23. At the fourth pulse in the signal B15 the logical 1 of the group G=5 occurs in the signal B22 so that the logical 0 appears in the signal B23.

The logical 1 in the signal B23 enables the gates 48 and 51 in the first (46, 47, 48) and second gating circuits (50, 51) of the read stage (46-51). The pulses of the signal B11 occur through the gate 48 in the signal B24 while the pulses of the signal B15 also occur therein through the signal inverter 47. The pulses in the signal B24 activate the store 10 with the negative going edges which thus delivers the stored code of the signal B21 as the signal B22 shown. The enabling of the gate 51 results in the signal values of the signal B22 occurring in the signal B25. The signals B26, B27 and B28 follow by passing on the logical 0 or 1 from the signal B25 shown in FIG. 5 at the D input of the flipflop 52 and the signal B11 at the T inputs of the flipflops 52, 53 and 54. The signals B1, B2 and B3 shown follow from the signals B28, B27 and B26 through the positive going pulse leading edges in the signal B4 with their triggering action on the T inputs of the flipflops 55, 56 and 57. It is found for the signals B1, B2 and B3 of FIG. 5 that the picture element signal values of the groups G=3 and G=4 are the same as given in FIG. 4 for the signals A1, A2 and A3. The picture information 13 present in the picture pick-up arrangement 1 is thus displayed in the correct manner in the picture display device 40 in the picture display arrangement 2. The picture display device 40 is of a type which can sequentially display simultaneously m=3 line data in a picture element. Any picture display device of such a type might be used. The picture display device 40 may be a facsimile printing apparatus which may be electronically active.

FIG. 6 shows a second embodiment of a picture pick-up arrangement according to the invention denoted by 1'. Components which are identical to those in the display arrangement 1 of FIG. 3 have the same reference numerals. Modified components are furthermore denoted by an index. The same indices are used for the signals A and particularly reference is made to the signals A1', A2' and A3'. In the pick-up arrangement 1 of FIG. 3 always m=3 signals (A1, A2, A3) are simultaneously generated through the multiline scanner 12 by the picture pick-up device 11 and made available for the three outputs. In contrast thereto the picture pick-up device 11' is formed with a single line scanner 12' and a single output. The picture information 13' is displaced between two successive single line scans. Since the picture information 13' is entirely processed after M line scans, the frequency divider 15' has a division number of M for supplying the raster signal R. Connected to the single output of the picture pick-up device 11' are $m-1=2$ delay circuits 60 and 61 in series formed as shift registers. The delay circuits 60 and 61 have their clock pulse inputs connected to the output of the frequency divider 17 which supplies the signal A4 with pulses of the picture element frequency $f_2$ as is shown in FIG. 4. The delay circuits 60 and 61 each yield one line time delay so that in the presence of the picture element information of the third line (A3') at the output of the picture pick-up device 11' the delay circuit 60 gives that of the second line (A2') and the delay circuit 61 gives that of the first line (A1'). It follows that for coding the picture element groups G with m=3 lines always $m-1=2$ line times are required as waiting tims. Each $m^{th}$ line of the picture information serves for activating the signal coder (21-35) and the picture element comparison circuit (36, 37, 38). To this end the control signals A4, A11 and A15 are only applied thereto during each $m^{th}$ line time by making these signals available through signal inverters 62, 63, 64 and NAND gates 65, 66, 67. Second inputs of the gates 65, 66 and 67 are connected together and connected to the output of a frequency divider 68. The line signal L is applied to the divider 68 and the divider 68 provides with a division number of m a release pulse for the gating circuit (62-67) at every $m^{th}$ line time.

Since the signal coder (21-35) and the picture element comparison circuit (36, 37, 38) in the picture pick-up arrangement 1' are only active during each last line time of the number of m=3 lines comprising a picture element group G, a time which is three times as long for processing the picture information 13' will be necessary as compared with the picture pick-up arrangement 1 when using the same frequencies $f_o, f_1, f_2$ and $f_3$. In fact, with intervals of $(m-1)$ line times the coded picture information (A19, A20) is applied to the store which does not have any influence on the ultimately stored coded signal A21. The signal A21 thus formed may be processed in the same manner as the signal B21 upon display in FIGS. 3 and 5. When it is, however, desired to process the picture information 13' in the same time in the picture pick-up arrangement 1' as the picture information 13 in the picture pick-up arrangement 1, an m times higher clock pulse frequency ($mf_1$) must be chosen in case of the same dividers 17 and 18, or in the case of the same clock pulse frequency $f_1$ the dividers 17 and 18 may have an m times smaller division number ($m \times n + 1$) or n.

FIG. 7 shows a picture display arrangement 2' which is formed with a picture display device 40' having a single input for the supply of the picture information to be displayed. In the same manner as in FIG. 6 relative to FIGS. 3 and 4, FIG. 7 relative to FIGS. 3 and 5 has the same reference numerals provided with indices and new numerals (70 etc). The read stage (46-51) and the series parallel converter (52, 53, 54) in the display arrangement 2' of FIG. 7 are identical to those given in the display arrangement 2 of FIG. 3. The same applies to the clock pulse source 41 supplying clock pulses of the frequency $f_1$. The frequency dividers 42' and 43' have a deviating division number (mxn+1) or n so that at the outputs signals with pulses of the frequency $mxf_2$ or $mxf_3$ occur. Pulses of the frequency $mxf_o$ are obtained through the frequency divider 44 with the unchanged division number ($mxn+1$) while the unchanged selective pulse suppressor provides groups of pulses of the frequency $mxf_3$. Since apart from the m times higher frequencies the control signals B4, B11 and B15 generated in accordance with FIG. 7 are furthermore equal to those given in FIGS. 3 and 5, the same notations are given for the sake of simplicity.

The flipflops 52, 53 and 54 of FIG. 7 convey the signals B26, B27 and B28 as shown in FIG. 5. The simultaneously available signals B26, B27 and B28 must be converted into sequential signals for the supply to the single picture information input of the display device 40'. To realise that the display device 40' of FIG. 7 displays the entire picture information in the same time as the display device 40 of FIG. 3 being active with three simultaneous signals, the division numbers of the dividers 42' and 43' have been taken a factor of three smaller. For performing the simultaneous sequential conversion which must be effected line by line the read stage (46-51) and the series parallel converter (52, 53, 54) are periodically active; in fact, the code information (B21) of a row of groups of picture elements is derived from the store 10 while the decoded information of the first line is directly applied to the display device 40'and simultaneously that of the subsequent ($m-1$) lines is stored. Subsequently reading of the store 10 is discontinued and the picture information of the second, third, etc. line is successively applied to the display device 40'. Subsequently a following reading of the store 10 is effected. For performing the periodical reading of the store 10 and the simultaneous sequential conversion a frequency divider 70 is connected in FIG. 7 to the output of the frequency divider 42' providing the signal B4 with pulses having the increased picture element frequency $mxf_2$. The divider 70 has a division number N×m so that a (shorter) line time is obtained through the number N and a number of m shorter line times is counted through the number m, the duration of the m number of shorter line times being equal to the line time described with reference to the display arrangement 2 of FIG. 3. The divider 70 thus provides a gating signal for the periodical action of the read stage (46-51) and the series parallel converter (52, 53, 54) during each first (shorter) line time of numbers of m(shorter) line times. The output of the divider 70 is connected to an input of a NAND gate 71, 72 to a second input of which the output of the frequency divider 44 and the selective pulse suppressor 45 is connected through signal inverters 73 and 74, respectively. The outputs of the gates 71 and 72 convey periodically the respective signals B15 and B11 for supply to the read stage (46-51) and the series parallel converter (52, 53, 54).

The frequency divider 70 is furthermore connected to an input of a NAND-gate 75, 76 a second input of which is connected to the Q output of the flipflop 53, 54 periodically conveying the signal B27, B28, respectively. The Q output of the flipflop 52 periodically conveying the signal B26 is connected to an input of a delay circuit 77 formed as a shift register to which the signal B4 is applied for control. The output of the delay circuit 77 is connected to an input of a NAND gate 78 a second input of which is connected through a signal inverter 79 to the frequency divider 70. The outputs of the gates 75 and 78 are connected to inputs of a NAND gate 80. The output of the gate 80 is connected to an input of a second $(m-1)^{th}$ delay circuit 81 which is formed as a shift register and to which the signal B4 is applied. The outputs of the delay circuit 81 and the signal inverter 79 are connected to inputs of a NAND gate 82. The outputs of the gates 82 and 76 are connected to inputs of a NAND gate 83 whose output is connected to the information input of the display device 40'. The display arrangement 2' of FIG. 7 is thus formed with a simultaneous-sequential converter (75-83) incorporated in a signal decoder (52, 53, 54, 75-83) while a signal decoding circuit (41-54, 70-83) is formed. The simultaneously occurring signals B26, B27 and B28 of FIG. 5 at the enabled gates 71 and 72 are applied during a short line time to the simultaneous-sequential converter (75-83). The gates 78 and 82 are blocked through the inverter 79 so that the gates 80 and 83 are enabled with the logical 1 at the outputs. Since the gates 75 and 76 are enabled the signal B28 is directly applied through the gate 83 to the display device 40' while the signal B27 is stored in the delay circuit 81. Likewise the signal B26 is stored in the delay circuit 77. Under the influence of the gating signal supplied by the frequency divider 70 the gates 71, 72, 75 and 76 are blocked and the gates 78 and 82 are enabled after the said line time during $m-1=2$ subsequent line times. The read stage (46-51) and the series parallel converter (52, 53, 54) are therefore switched off while the picture information is applied through the enabled gates 82 and 83 from the delay circuit 81 to the display device 40' and which information is supplied from the delay circuit 77 through the gates 78 and 80 to the delay circuit 81. Subsequently the original information stored in the delay circuit 77 is applied to the display device 40' during the next (third) line time. A subsequent cycle then begins with a direct supply of the picture information of a row of groups of picture elements through the gate 76 and the storage thereof in the delay circuits 77 and 81. Since the specific embodiment of the picture display device 40' is irrelevant for the invention, it is left out of consideration.

What is claimed is:

1. A facsimile transmission system comprising a picture pick-up device means for converting line by line, through lines comprising picture elements, picture information to be transmitted into a picture signal, a picture signal coding circuit having a picture element comparison circuit means for deriving a coded signal from picture signal values associated with adjacent picture information, the signal coded circuit having a clock pulse source means for control purposes and a store means coupled to said clock for storage of the coded signal, the picture element comparison circuit comprising means for comparing the picture element signal values associated with a first number of adjacent lines and a second number of adjacent picture elements or one picture element of each of the said lines, said signal coding circuit having a signal coder means coupled to said coding circuit for supply of a comparison signal thereto which in the presence of one and the same fixed picture signal value in all compared picture elements constituting a group causes the coder to supply a determined fixed code signal and which in the absence of the same fixed picture signal value in all picture elements of the group releases the coder for supplying during processing of the said picture signal values and instantaneous code signal derived as a function of the occurrence of the different picture signal values in the respective compared picture elements of the group.

2. A facsimile transmission system as claimed in claim 1, wherein the signal coding circuit is successively active for picture element groups which do not have any common picture elements.

3. A facsimile transmission system as claimed in claim 1, wherein the fixed code signal consists of one bit and the instantaneously derived code signal conists of one bit having a value different from the previously mentioned bit and subsequently of a number of bits for coding the number of picture elements of each group for the different picture element signal values.

4. A facsimile transmission system as claimed in claim 1, wherein said clock pulse source has a frequency which can be divided by the product of the said second number and of a number of bits suitable for coding the number of picture elements of the group plus one, or a multiple of the said product, having the same value as the said first number.

5. A facsimile transmission system as claimed in claim 1, wherein the signal coding circuit includes a first frequency divider coupled to the clock pulse source having a division number equal to a number of bits suitable for coding the number of picture elements of the group plus one or a multiple thereof having the value of the said first number, said first frequency divider having an output means for conveying picture element frequency pulses, which output means is coupled to the picture pick-up device, the picture element comparison circuit and the signal coder.

6. A facsimile system as claimed in claim 1, wherein the picture pick-up device comprises a multi-line scanner which simultaneously scans the said first number of lines and supplies the picture element signal values of the respective lines in the picture to the same number of outputs which are connected to as many inputs of the picture element comparison circuit and the signal coder.

7. A facsimile transmission system as claimed in claim 1, wherein the picture element comparison circuit comprises a gate having at least the said first number of inputs for simultaneous and sequential reception of the signal values of the group of picture elements and an output, a first flip flop having an input coupled to the output of the said gate and a set or reset input, a third frequency divider coupled to said set or reset input and to the clock pulse source in the signal coding circuit, said third frequency divider having a division number suitable for supplying a signal with a picture codes frequency pulse, the flip flop having an output means for conveying a comparison signal.

8. A facsimile transmission system as claimed in claim 7, wherein the picture element comparison circuit further comprises a second flip flop active as a store and having an input coupled to an output of the first flip flop, another input coupled to the third frequency divider in the signal coding circuit, and an output means for conveying the comparison signal for supply to the signal coder.

9. A facsimile transmission system as claimed in claim 1, wherein the picture pick-up device comprises a single-line scanner having a single output a number of delay circuits coupled in series to the picture pick-up device, which number is equal to the said first number minus one, the outputs of the delay circuits giving a delay of one line time and the single output of the picture pick-up device being coupled to an equally large number of inputs of the picture element comparison circuit and the signal coder.

10. A facsimile transmission system as claimed in claim 9, further comprising a fourth frequency divider having an input and an output and a division number equal to the said first number signals of line frequency being applied to said fourth frequency divider input, and a gating circuit means coupled to said fourth divider output for releasing the signal coder and the picture element comparison circuit during each last line scan time of the first numbers of adjacent lines and for blocking same during the preceding line scans in the picture pick-up device.

11. A facsimile transmission system as claimed in claim 1, wherein the signal coder comprises a parallel to series converter having a first number of input means for simultaneous and sequential reception of the picture element signal values of the picture elements in one group and an output, a row of series-arranged flip flops coupled to said converter output, said flip flops having trigger inputs equal to the first number and being coupled together, a selective pulse suppressor having an output coupled to said trigger inputs, a second frequency divider coupled between said suppressor and the clock pulse source, said second frequency divider having a division number suitable for supplying through the pulse suppressor groups of pulses provided for the picture element coding in the said instantaneous code signal, and a first gating circuit having inputs coupled to the output of the parallel to series converter and of the said pulse suppressor and an output for providing the instantaneous code signal.

12. A facsimile transmission system as claimed in claim 11, wherein said first gating circuit comprises enabling or blocking inputs coupled to the output of the picture element comparison circuit conveying the comparison signal.

13. A facsimile transmission system as claimed in claim 11, wherein the signal coder has a second gating circuit having inputs coupled to said first gating circuit, said first gating circuit enabling the second gating circuit when it is blocked, the second gating circuit having further inputs coupled to the said first frequency divider, a third frequency divider coupled to said further inputs and to the clock pulse source in the signal coding circuit, said third frequency divider having a division number suitable for supplying a signal with a picture group frequency pulse, the fixed code signal being available from said second gating circuit in the signal coder.

14. A facsimile reception system comprising a signal decoding circuit for decoding a received coded signal, and a picture display device coupled thereto, the signal decoding circuit comprising a clock pulse source means for control purposes and a store means coupled to said clock for storage of the coded signal, and said decoding circuit comprises input means for receiving a coded signal derived by comparing the picture element signal values associated with a first number of adjacent lines and a second number of adjacent picture elements or one picture element of each of said lines, said coded signal comprising upon the presence of one and the same fixed picture signal value in all compared picture elements constituting a group a determined fixed code signal and upon the absence of the same fixed picture signal value in all picture elements of the group and instantaneous code signal derived as a function of the occurrence of the different picture signal values in the respective compared picture elements of the group.

15. A facsimile reception system as claimed in claim 14, wherein the store has an output means for synchronisation coupled to the clock pulse source, said decoding circuit comprising a read stage frequency dividers coupled between said read stage and said clock said read stage being coupled to a read input of the store for reading thereof, and a signal decoder having a single input coupled to the read stage, said signal decoder comprising a series to parallel converter having said first number of outputs.

16. A facsimile reception system as claimed in claim 15, wherein the signal decoding circuit comprises a first frequency divider coupled to the clock pulse source and which has a division number equal to a number of bits suitable for coding the number of picture elements of the group plus one or a multiple thereof equal to the said first number said frequency divider supplying said picture element frequency pulses being coupled to the signal decoder.

17. A facsimile reception system as claimed in claim 15, wherein the signal decoding circuit further comprises a second frequency divider coupled to the clock pulse source, a selective pulse suppressor coupled to said second divider and to the read stage for reading the store and to the series to parallel converter in the signal decoder for series registering of the picture signal values, said second frequency divider having a division number suitable for supplying through the selective pulse suppressor groups of a number of pulses equal to the number of bits intended for the picture element coding in the said instantaneous code signal.

18. A facsimile reception system as claimed in claim 15, wherein the signal decoding circuit comprises the said first number of outputs coupled to said picture display device, said device being suitable for picture element sequential and line-simultaneous display of the information originating from each of said first number of adjacent lines.

19. A facsimile system as claimed in claim 15, further comprising a simultaneous sequential converter having inputs coupled to the outputs of said series to parallel converter and a single output which comprises the output of the signal decoding circuit coupled to the picture display device, and a fourth frequency divider coupled to the said first frequency divider, said fourth frequency divider having means for applying a gating signal to the read stage and the series parallel converter for periodical activation during a line time occurring in the picture display device in cycles of the said first number of line times and to the simultaneous sequential converter for reading of delay circuits occurring therein during the remaining line times in all cycles of line times.

20. A facsimile reception system as claimed in claim 15, wherein the signal decoding circuit comprises a third frequency divider coupled to the clock pulse source, said third frequency divider having a division number suitable for supplying a picture group frequency pulse to the output connected to the read stage.

21. A facsimile reception system as claimed in claim 20, wherein the read stage comprises a flip flop having a preparatory input coupled to the read output of the store conveying the coded signal and a trigger input coupled to the said third frequency divider said third divider being coupled to the read input of the store, a first gating circuit coupled to the flip flop output and having an input coupled to the selective pulse suppressor and an output coupled to the read input of the store, and a second gating circuit coupled to said flip flop output and between the read output of the store and the input of the signal decoder.

* * * * *